March 11, 1952　　　D. M. McCALLUM　　　2,588,742
SERVO CONTROL SYSTEM
Filed June 12, 1950　　　　　　　　　　　　　　2 SHEETS—SHEET 1

Donald Murdo McCallum
Inventor
By Cushman, Darby & Cushman
Attorneys

March 11, 1952   D. M. McCALLUM   2,588,742
SERVO CONTROL SYSTEM
Filed June 12, 1950   2 SHEETS—SHEET 2

Donald Murdo McCallum
Inventor
By Cushman, Darby & Cushman
Attorneys

Patented Mar. 11, 1952

2,588,742

UNITED STATES PATENT OFFICE 2,588,742

SERVO CONTROL SYSTEM

Donald Murdo McCallum, Edinburgh, Scotland, assignor to Ferranti Limited, Hollinwood, England, a British company Application June 12, 1950, Serial No. 167,675
In Great Britain June 16, 1949

7 Claims. (Cl. 318—28)

This invention relates to servo systems of the type in which the relative dispositions of movable input and output members determine the value of a relative characteristic, such as a phase or frequency difference, of input and output voltages and in which any non-correspondence between the dispositions of the two members causes a departure of that relative characteristic from a fixed datum value, from which departure is developed a corrective adjustment of the output member.

In the majority of cases the input and output members are rotatable shafts, their relative dispositions being their angular positions.

In a known variety of servo system of this type the dispositions of the members control the frequencies of the input and output voltages. In this case the relative characteristic above mentioned is the difference between these frequencies, the fixed datum value of this difference being zero. Whenever the value of the relative characteristic departs from zero, i. e. whenever the frequencies become unequal, consequent upon the non-correspondence of the members, an error signal is developed—usually in dependence on the heterodyne beat-note of the unequal frequencies—and is applied to adjust the output member to the correct position. This variety is apt to be slow in action and not very reliable for small departures of the members from correspondence.

Another known variety of servo system of the type stated operates in a similar manner to that described in the preceding paragraph except that instead of operating on a frequency difference it operates on a phase difference, using some sort of discriminator to derive the error signal. The dispositions of the members accordingly control the frequencies of the input and output voltages as before but the relative characteristic is here the phase difference between the input and output voltages. The fixed datum value of this difference is zero degrees or 90 degrees depending on the type of phase discriminator used. With this variety the servo motor is seldom fast enough in operation to prevent the phase difference shifting beyond 90 degrees so that a beat frequency is apt to be produced instead of the required D. C. error signal.

The object of the present invention is to provide a servo system of the type stated of simple and efficient character.

A further object of the invention is to provide a servo system of the type stated in which the corrective adjustment of the output member is effected more quickly, which is reliable for small departures of said members from correspondence, and in which the development of a D. C. error signal is ensured.

In accordance with the present invention a servo system has an input member and an output member to be maintained in dispositional correspondence, input A. C. voltage deriving means, means for rendering the frequency of said input A. C. voltage dependent on the disposition of said input member, output A. C. voltage deriving means, means for rendering the frequency of said output A. C. voltage dependent on the disposition of said output member, means for determining the phase difference between said input and said output voltages, means for deriving an error signal from any departure of said phase difference from a fixed datum value, error-signal utilizing means for shifting the frequency of said output A. C. voltage to approximate equality with the frequency of said input A. C. voltage, only whilst said error signal is being utilized, and motor means for utilizing said error signal to bring said output member into dispositional correspondence with said input member, thereby modifying said frequency of said output A. C. voltage to reduce said error signal to zero.

In the accompanying drawings.

Figure 1:
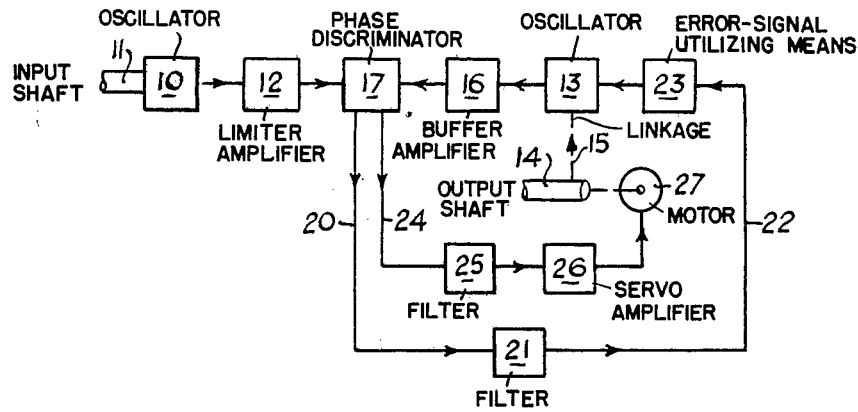
Figure 1 is a schematic diagram of one embodiment of the invention.

A simplified form of the invention will now be described with reference to Figure 1. In carrying out the invention according to this form a servo system having an input and an output member to be maintained in dispositional correspondence, that is to say an input and an output shaft to be maintained in angular correspondence, comprises input A. C. voltage deriving means in the form of an oscillator 10. The frequency of the input voltage derived by the oscillator is dependent on the angular disposition of the input shaft 11, which may for example be arranged to adjust the tuning of a condenser forming part of the oscillatory circuit. The input voltage, which is of approximately sinusoidal waveform, is applied to a combined limiter and amplifier 12 designed to provide an amplified waveform of the same frequency and having a constant amplitude despite any fading or distortion of the sinusoidal waveform. Output A. C. voltage deriving means in the form of another oscillator 13 is designed, as will be explained in detail later, so that the output voltage derived by it has a square waveform the frequency which is dependent on the angular disposition of the output shaft 14, which is coupled to some frequency-determining component of oscillator 13 by some convenient linkage 15. The output voltage is applied by way of a buffer amplifier 16 to a phase discriminator 17, to which is also applied the input voltage after modification to square waveform by limiter 12.

Discriminator 17 is designed in known manner to determine the phase difference between the input and the output voltages and derive a D. C. error signal that is in sense and quantitative dependence on any departure of that phase difference from a fixed datum value; it is assumed that the discriminator used is of the type in which this datum value is 90 degrees, though discriminators operating on other datum values may alternatively be used.

The error signal is applied by a connection 20 and a filter 21, which is designed to eliminate any alternating currents (especially those at the sum frequency of the input and output voltages), and a connection 22 to error-signal utilizing means 23 which, as will be made clear later, forms one of the frequency-determining components of oscillator 13.

The error signal is also applied by way of a connection 24, a filter 25 (the function of which is similar to that of filter 21), and a servo amplifier 26 to motor means in the form of a reversible servo motor 27 the rotor of which is connected direct or through a suitable transmission system to output shaft 14.

In operation, assume to begin with that the shafts are in dispositional—i. e. angular—correspondence. The system is so designed that the input and output voltages then have the same frequency, and the phase difference between them has the fixed datum value of 90 degrees, with, say, the input voltage leading. Accordingly no error signal is developed. Suppose now that the input shaft 11 is given a small angular displacement in such a direction as to increase the input frequency, i. e. the frequency of the input voltage. The shafts 11 and 14 at once cease to be in correspondence. The input voltage begins to increase its lead on the output voltage, and the phase difference between them ceases to have the fixed datum value of 90 degrees. An increasing D. C. voltage representing the error signal is accordingly developed; the value of this at any given moment depends on the extent to which the phase difference exceeds the datum value at that moment; the connection from the output of discriminator 13 is so made that this error signal voltage is, say, positive.

As soon as this signal begins to be developed it so operates on error-signal utilizing means 23 as to begin to shift the output frequency, i. e. the frequency of the output voltage, towards equality with the new increased value of the input frequency. This tuning adjustment continues until the output frequency has been raised approximately to this equality. If the output frequency were to remain unchanged at its original value the error signal would have a periodic waveform at the difference frequency. The tuning adjustment described is however so rapid that the output frequency is raised to approximate equality with the input frequency before the error signal has developed a quarter of its periodic wavelength. The frequencies are thus again approximately equal at a comparatively steady phase difference that is sufficiently greater than the fixed datum value of 90 degrees for the resulting comparatively steady positive error signal voltage to maintain the altered tuning of the oscillator.

The error signal has so far had insufficient time to effect any substantial adjustment (through motor 27) of output shaft 14. With the error signal settled into its comparatively steady state, however, the motor operation begins to take effect and adjust the output shaft and hence, through linkage 15, the tuning of oscillator 13. As however this oscillator has already been tuned approximately to the new frequency (as described in the preceding paragraph) the result of now adjusting the tuning by the motor is to tend to increase the output frequency above the new value of the input frequency. As soon as this begins to happen the output voltage begins to decrease the lead of the input voltage, thus decreasing the positive error signal voltage below the comparatively steady values referred to above. This decrease in error signal voltage reduces the effect exerted by signal-utilizing means 23, which accordingly tends to shift the output voltage in the reverse direction to that indicated above and so tends to decrease it.

The combined effect of these two adjustments that simultaneously tend to increase and decrease respectively the output frequency from its equality with the new value of the input frequency is that the output frequency remains transiently at a value very slightly greater— usually by not more than one cycle per second— than that of the input frequency, with the result that the lead of the input voltage becomes reduced towards datum value. By the time datum value of phase difference has been reached the error signal has become zero, the error-signal utilizing means has ceased to shift the output frequency, which frequency has decreased to exact equality with the new value of the input frequency. The necessary adjustment of oscillator 13 to raise the output frequency to the new value has thus as it were been taken over by the motor 27 and in the process output shaft 14 has become correctively adjusted into dispositional correspondence with input shaft 11.

The process described in the last four paragraphs may be summarized as follows: Each time the input frequency is altered (by angular movement of the input shaft) the error signal rapidly effects a "provisional" adjustment through signal-utilizing means 23 of the tuning of oscillator 13 to adjust the output frequency to approximate equality; motor 27 controlling the output shaft then operates, somewhat less rapidly, and whilst correctively adjusting the output shaft converts that "provisional" adjustment to a "permanent" one, during which process the tuning effect exerted by the error signal through utilizing means 23 is reduced to zero. This "permanent" adjustment remains until the next alteration of the input shaft.

The system operates in a similar manner when the input shaft is so displaced as to reduce the input frequency. The phase difference is now less, not more, than the fixed datum value; accordingly the error signal voltage is negative this time, and its value depends on the extent to which the phase difference is less than the datum value. The frequency shift exerted by the error-signal utilizing means is now in the opposite direction, so lowering the output frequency until the frequencies become equal. The negative error signal voltage causes the motor to revolve in the reverse direction with the result that the output shaft adjusts the oscillator tuning so as to tend to reduce the output frequency. The further operation is exactly similar to that described above, the output shaft being again correctively adjusted.

It will be appreciated that the frequency shift exerted by the error-signal utilizing means is effective only whilst the error signal is being utilized; when the error signal is zero the frequency shift is zero, i. e. the output frequency is then dependent only on the disposition of the output shaft.

It will also be appreciated that the motor actually begins to operate as soon as the error signal has been developed and before the error-frequency utilizing means has effected the approximate equalization of the input and output frequencies, but owing to the inertia of the rotor of the motor the latter does not operate appreciably until that approximate equalization has been effected. The term "approximate" is used in this connection because during the time the motor is operating the input and output frequencies differ very slightly as explained above. Similarly the phase difference is only "comparatively" steady, for by the time approximate equalization has been effected the motor has begun to restore the phase difference to its datum value.

Figure 2:
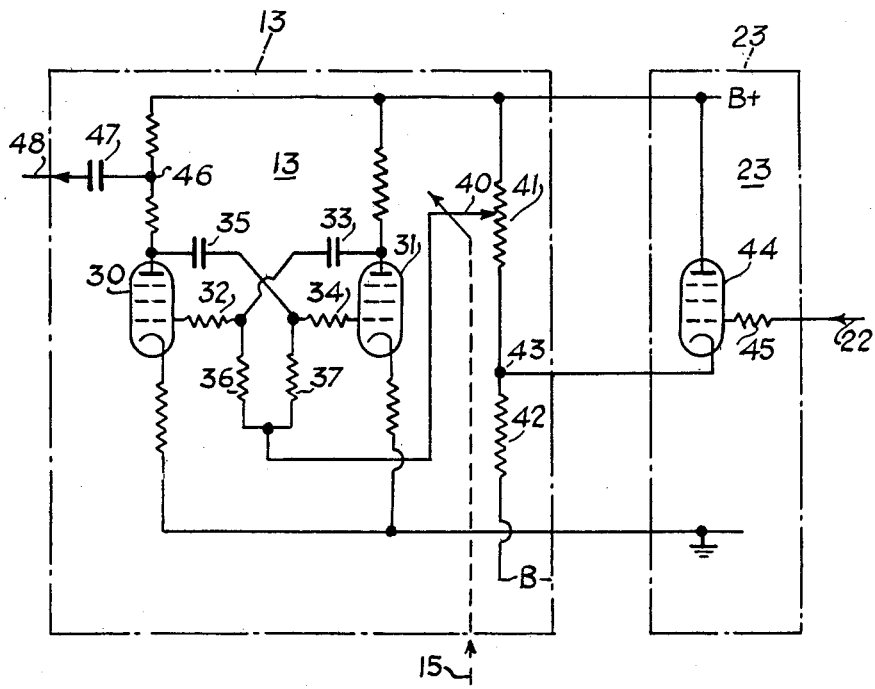
Figure 2 shows details of parts of the embodiment shown in Figure 1.

Of the components already referred to, phase discriminator 17 may be a conventional ring modulator. Standard circuit arrangements may also be used for the other components with the exception of oscillator 13 and error-signal utilizing means 23, which components will now be described in detail with reference to Figure 2.

Oscillator 13 is of the multivibrator type including two valves 30 and 31 the control grid of each of which is cross-connected in the usual way to the anode of the other valve. In detail, the control grid of valve 30 is connected to the anode of valve 31 by way of a resistor 32 and a condenser 33, whilst the control grid of valve 31 is connected to the anode of valve 30 by way of a resistor 34 and a condenser 35. The control grids are additionally connected by way of resistors 36 and 37 respectively to a source of common bias provided by an adjustable tapping 40 on a potentiometer 41 connected in series with a fixed resistor 42 between the positive pole of the supply and a negative supply source of the order of 130 volts. The common point 43 of potentiometer 41 and resistor 42 is connected to the cathode of a third valve 44, which is arranged as a cathode follower, resistor 42 acting as the cathode load. The D. C. error signal voltage is applied by way of lead 22 (see Figures 1 and 2) and a resistor 45 to the control grid of valve 44, which valve constitutes the error-signal utilizing means 23. Tapping 40 is arranged to be adjustable by output shaft 14 (Figure 1) by way of linkage 15. From a suitable tapping point 46 on the load resistor of valve 30 an output connection is made by way of a condenser 47 and a lead 48 to buffer amplifier 16 (see Figure 1). Other details of the oscillator are conventional and will not be particularised.

It will be appreciated that with an oscillator of this kind a voltage of square waveform is developed at the anode of valve 30, the frequency of which voltage is dependent on the value of the common bias of the control grids of valves 30 and 31. This bias is determined by two factors (1) the potential of the control grid of valve 44, which in the usual cathode-follower manner controls the potential of the cathode and hence of the point 43 on the bias network, and (2) the setting of tapping 40.

Figure 3:
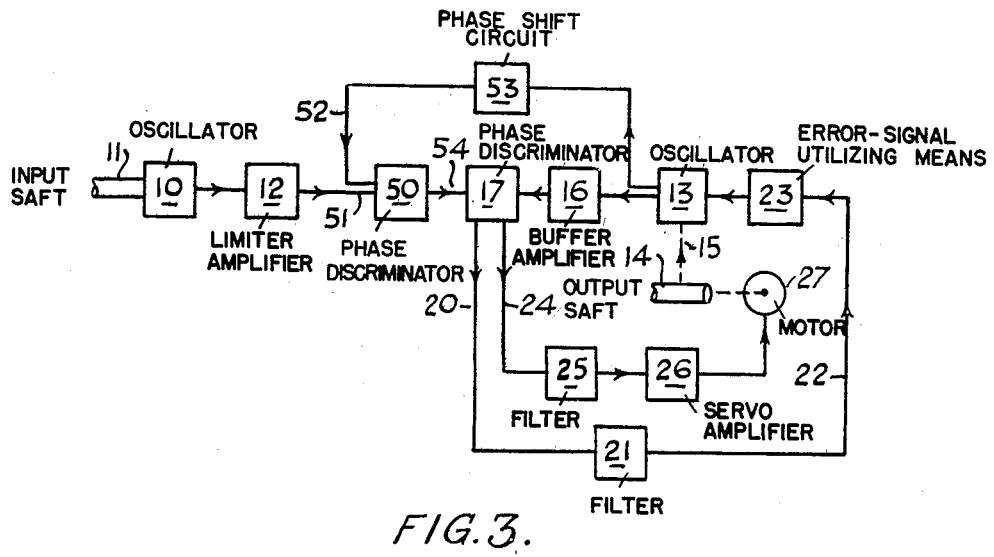
Figure 3 is a schematic diagram of another embodiment of the invention.

Factor (1) is of course determined by the error signal. When this signal is zero the circuit constants are such as to cause the potential of the point 43 to have always the same predetermined basic value; the value of the common bias and hence the frequency of operation is then determined solely by factor (2), i. e. position of tapping 40, which in turn is dependent on the angular position of the output shaft acting through linkage 15. Whenever the error signal has a value other than zero the resulting alteration of the grid bias of valve 44 alters the potential of the point 43, and hence shifts the output frequency as described above. This shift is thus in sense and quantitative dependence on the error signal; as the error signal increases in the first instant to effect equalization of the frequencies the shift increases too; as the error signal decreases owing to the operation of the motor and resulting adjustment of tapping 40 the shift decreases, the potential of the point 43 eventually returning to its previous basic value when the error signal returns to zero.

Where it is found that filters 21 and 25 do not sufficiently eliminate from the D. C. error signal voltage A. C. voltages at the sum frequency of the input and output voltages, the system described with reference to Figure 1 may be modified as shown in Figure 3, in which those components already described with reference to Figure 1 are given the same references and will not be described further.

In this arrangement use is made of a special discriminator circuit 50 to which is applied over a connection 51 the input voltage from limiter 12 and over a connection 52 the output voltage from oscillator 13 by way of a phase-shift circuit 53 which displaces the phase of this voltage with respect to the phase of the input voltage by 90 degrees in the direction in which the phase of the output voltage is already displaced, it being again assumed that the phase discriminator 17 is of the kind that operates from a 90 degrees datum. It will thus be seen that the effect of this second displacement of the phase of the output voltage is to cause the input and output voltages as applied to special discriminator 50 over leads 51 and 52 to be in phase opposition when the input and output shafts are in angular correspondence. The output from special discriminator 50 is applied over a connection 54 to phase discriminator 17.

Figure 4:
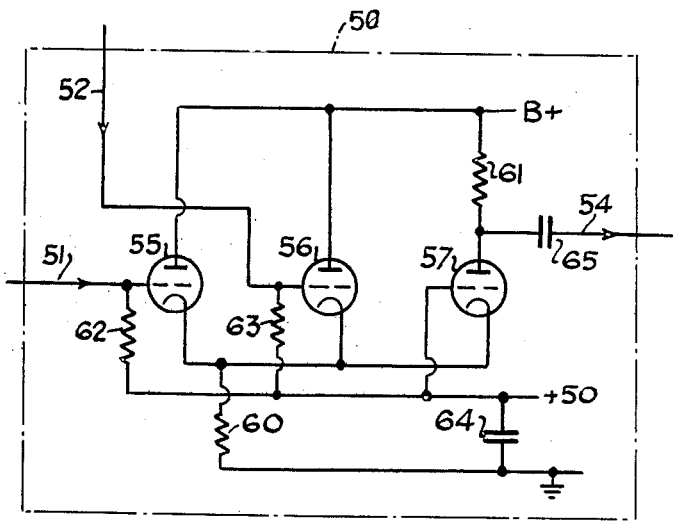
Figure 4 shows details of a part of the embodiment shown in Figure 3.

Special discriminator 50 consists of three valves 55, 56, and 57—see Figure 4—the cathodes of which are connected to earth by way of a common resistor 60. The anodes of valves 55 and 56 are connected direct to the positive pole of the supply source and the anode of valve 57 to the source by way of a load resistor 61. The control grids of the three valves are connected to a source of positive bias of the order of about 50 volts by way of resistors 62 and 63 and a direct connection respectively. The bias source is decoupled to earth by a large condenser 64. The input voltage is applied over connection 51 to the control grid of valve 55; the output voltage, phase-displaced by circuit 53 as above described, is applied over connection 52 to the control grid of valve 56. The anode of valve 57 is connected by way of a blocking condenser 65 and connection 54 to phase discriminator 17.

The grid biasing system is such that valve 57 cannot conduct unless both the other valves are cut off.

With this arrangement, when the input and output shafts are in angular correspondence and accordingly the input and output voltages, as applied to valves 55 and 56, are in phase opposition, these two valves conduct alternately. Valve 57 accordingly remains cut off except during the momentary periods when the input and output voltage waveforms simultaneously pass through zero; both valves 55 and 56 are momentarily cut-off here and accordingly a narrow pulse is developed at the anode of valve 57 and fed to discriminator 17. As this pulse can be disregarded, the input to the discriminator is effectively zero and no error signal voltage is developed. Whenever the input and output voltages are not in phase opposition, due to non-correspondence of the input and output shafts, the periods when valves 55 and 56 are both cut-off become appreciable and the resulting input to discriminator 17, being in quadrature with the other input from oscillator 13 by way of buffer amplifier 16 produces an error signal voltage of appropriate polarity. With this arrangement the A. C. voltage at sum frequency is virtually eliminated when the input and output voltages are in or nearly in phase opposition since one of the inputs to discriminator 17 is then practically zero. This A. C. voltage is thus practically eliminated when the error signal has a zero value.

The phase-shift circuit 53 may take any convenient form. Where the output voltage leads the input voltage and in consequence a further leading displacement of 90 degrees of the output voltage is required this circuit may for example comprise a Miller integrator to the control grid of which the square waveform of the output voltage is applied, this grid being biased to the middle of the straight part of the valve's characteristics. The potential on the anode of the valve then falls linearly with respect to time during the positive half-cycles of the output voltage waveform and rises linearly during the negative half-cycles. A voltage of triangular waveform leading the voltage of square waveform by 90 degrees is thus derived at the anode of the valve; this triangular waveform may be converted to a square waveform in phase with it before application to special discriminator 50 by means of a limiter, similar to limiter 12, forming part of the phase-shift circuit.

Where the phase discriminator is of the kind that produces a zero error signal when the relative phase of the applied voltages has some datum value other than 90 degrees, the extent of the phase-displacement effected by phase-shift circuit 53 must of course be modified accordingly to ensure that the voltages applied to valves 55 and 56 are in phase opposition when the input and output members are in dispositional correspondence.

The above-described embodiments are for illustrative purposes only and may be modified in detail within the scope of the invention; for example the servo motor need not necessarily be a reversible motor controlled by the direct application of the error signal but may instead be a non-reversible motor rotated at a constant speed and coupled to the output shaft by oppositely-acting clutches which are themselves controlled by the error signal.

With either of the embodiments described above the corrective adjustment of the output member is effected very quickly and with a reliability that is maintained for small departures of the member from correspondence.

What I claim is:

1. A servo system having an input member and an output member to be maintained in dispositional correspondence, input A. C. voltage deriving means, means for rendering the frequency of said input A. C. voltage dependent on the disposition of said input member, output A. C. voltage deriving means, means for rendering the frequency of said output A. C. voltage dependent on the disposition of said output member, means for determining the phase difference between said input and said output voltages, means for deriving an error signal from any departure of said phase difference from a fixed datum value, error-signal utilising means for shifting the frequency of said output A. C. voltage to approximate equality with the frequency of said input A. C. voltage, only whilst said error signal is being utilised, and motor means for utilising said error signal to bring said output member into dispositional correspondence with said input member, thereby modifying said frequency of said output A. C. voltage to reduce said error signal to zero.

2. A servo-system having an input member and an output member to be maintained in dispositional correspondence, input A. C. voltage-deriving means, means for rendering the frequency of said input A. C. voltage dependent upon the disposition of said input member, output A. C. voltage-deriving means comprising a multivibrator circuit including two discharge tubes each comprising a cathode, an anode and at least one intermediate electrode and each having an intermediate electrode cross-connected to the anode electrode of the other tube and means for applying a bias voltage to at least one of said intermediate electrodes, means for rendering the frequency of said output A. C. voltage dependent upon the disposition of said output member, means for determining the phase difference between said input and said output voltages, means for deriving an error-signal from any departure of said phase difference from a fixed datum value, error-signal utilising means for shifting the frequency of said output A. C. voltage to approximate equality with the frequency of said input A. C. voltage only whilst said error-signal is being utilised, said error-signal utilising means comprising a third discharge tube having a control electrode for controlling the emission current of said third tube, means for applying said error-signal to said control electrode and means for utilising said emission current to control said bias voltage of said output A. C. voltage-deriving means, and motor means for utilising said error-signal to bring said output member into dispositional correspondence with said input member thereby modifying said frequency of said output A. C. voltage to reduce said error-signal to zero.

3. A servo-system having a movable input member and a movable output member to be maintained in dispositional correspondence, input square-wave A. C. voltage-deriving means, means for rendering the frequency of said input square-wave A. C. voltage dependent upon the disposition of said movable input member, output square-wave A. C. voltage-deriving means, means for rendering the frequency of said output square-wave A. C. voltage dependent upon the disposition of said movable output member, means for determining the phase difference between said input and said output voltages, means for deriving an error-signal from any departure of said phase difference from a fixed datum value, error-signal utilising means for shifting the frequency of said output square-wave A. C. voltage to approximate equality with the frequency of said input square-wave A. C. voltage only whilst said error-signal is being utilised and motor means for utilising said error-signal to bring said movable output member into dispositional correspondence with said movable input member thereby modifying said frequency of said output square-wave A. C. voltage to reduce said error-signal to zero.

4. A servo-system having a movable input member and a movable output member to be maintained in dispositional correspondence, a variable frequency oscillator providing an input A. C. voltage and having its frequency-varying means coupled to said movable input member whereby the frequency of said input A. C. voltage is dependent upon the disposition of said input member, a second variable frequency oscillator providing an output A. C. voltage, said second oscillator having first frequency-varying means coupled to said movable output member and second frequency-varying means controllable by an applied D. C. control voltage whereby the frequency of the output A. C. voltage is varied either by movement of said output member or by alteration of said applied D. C. control voltage, a phase discriminator supplied with said input A. C. voltage and said output A. C. voltage for determining the phase difference between said applied voltages and providing a D. C. error-signal whose sign and magnitude is dependent upon such phase difference, means for applying said D. C. error-signal as a D. C. control voltage to said second oscillator circuit so as to shift the frequency of said second oscillator to approximate equality with the input A. C. voltage from said first oscillator only during the occurrence of said error-signal, motor means mechanically coupled to said movable output member, and servo amplifier means for utilising said D. C. error-signal output from said phase discriminator circuit to rotate said motor means in a direction which moves said output member into dispositional correspondence with said input member and thereby alters the frequency of said second oscillator towards equality with said input A. C. oscillation to reduce said error-signal to zero.

5. A servo-system having a movable input member and a movable output member to be maintained in dispositional correspondence, a first oscillator having a variable frequency control mechanically coupled to said movable input member, said oscillator providing a sinusoidal oscillatory voltage at a requency dependent upon the position of said movable input member, a limiter/amplifier converting said sinusoidal oscillation to a square-wave oscillation of constant amplitude, a second oscillator providing a square-wave oscillation and having a variable frequency control mechanically coupled to said output member whereby movement of said output member causes alteration of the frequency provided by said second oscillator, a phase-discriminator circuit supplied with each of said square-wave oscillations and including means for deriving an error-signal upon departure of the phase difference between said applied oscillations from a fixed datum value, means associated with said second oscillator for altering its frequency by means of an applied control potential, means for applying said error-signal to said frequency altering means for shifting the frequency of said second square-wave generator oscillator to approximate equality with the frequency of said first oscillator only when said error-signal is being applied, motor means mechanically coupled to said movable output member and means, including a servo-amplifier, for utilising the error-signal output from said phase discriminator circuit to drive said motor means in a direction which will alter the frequency of said second oscillator to equality with said first oscillator and thereby reduce said error-signal to zero.

6. A servo system having an input member and an output member to be maintained in dispositional correspondence, a first oscillator for providing a sinusoidal input A. C. voltage, said first oscillator having a mechanically variable frequency control coupled to said input member for rendering the frequency of said input A. C. voltage dependent upon the disposition of said input member, a limiter/amplifier for converting said sinusoidal input A. C. voltage into a square-wave input A. C. voltage of constant amplitude, a second oscillator for providing a square-wave output A. C. voltage, said second oscillator having a mechanically variable frequency control linked to said output member for rendering the frequency of said output A. C. voltage dependent upon the disposition of said output member and a further electrically variable frequency control for rendering the frequency of said output A. C. voltage dependent upon the sign and magnitude of an applied D. C. control voltage, a phase discriminator supplied with each of said square-wave A. C. voltages and including means for developing a D. C. error-signal whose sign and magnitude are dependent upon the departure of the phase difference between said square-wave A. C. voltages from a fixed datum value, motor means coupled to said output member, means for utilising said D. C. error-signal as a D. C. control voltage for operating said electrically variable frequency control to shift the frequency of said output A. C. voltage to approximate equality with the frequency of said input A. C. voltage only while said error-signal is being applied and means including a servo amplifier for utilising said error-signal to control energisation of said motor means for operating said mechanically variable frequency control of said second oscillator to alter the frequency of said second oscillator to reduce the error-signal to zero and bring said output member into dispositional correspondence with said input member.

7. A servo system having an input member and an output member to be maintained in dispositional correspondence, a first oscillator for providing a sinusoidal input A. C. voltage, said first oscillator having a mechanically variable frequency control coupled to said input member for rendering the frequency of said input A. C. voltage dependent upon the disposition of said input member, a limiter/amplifier for converting said sinusoidal input A. C. voltage into a square-wave input A. C. voltage of constant amplitude, a second oscillator for providing a square-wave output A. C. voltage, said second oscillator having a mechanically variable frequency control linked to said output member for rendering the frequency of said output A. C. voltage dependent upon the disposition of said output member and a further electrically variable frequency control for rendering the frequency of said output A. C. voltage dependent upon the sign and magnitude of an applied D. C. control voltage, a first phase discriminator for determining the phase difference between first and second signal inputs applied thereto, said first phase discriminator including means for deriving a D. C. error-signal whose sign and magnitude is dependent upon the departure of the determined phase difference from a fixed datum value, a second phase discriminator, means for applying said square-wave input A. C. voltage as a first input to said second phase discriminator, means including a phase-shifting circuit for applying said square-wave output A. C. voltage as a second input to said second phase discriminator, said phase-shifting circuit producing phase opposition between said respective first and second inputs when said input and output A. C. voltages are of equal frequency and said input and output members are in dispositional correspondence, means for applying the resultant output of said second phase discriminator as a first signal input to said first discriminator, means for applying said output A. C. voltage as a second signal input to said first discriminator, motor means coupled to said output member, means for utilising said D. C. error-signal as a D. C. control voltage for operating said electrically variable frequency control to shift the frequency of said output A. C. voltage to approximate equality with the frequency of said input A. C. voltage only while said error-signal is being applied and means including a servo amplifier for utilising said error-signal to control energisation of said motor means for operating said mechanically variable frequency control of said second oscillator to alter the frequency of said second oscillator to reduce the error-signal to zero and bring said output member into dispositional correspondence with said input member.

DONALD MURDO McCALLUM.

REFERENCES CITED

The following references are of record in the file of this patent:

UNITED STATES PATENTS

| Number | Name | Date |
|---|---|---|
| 2,280,019 | Alexandersson et al. | Apr. 14, 1942 |
| 2,404,852 | Koch | July 30, 1946 |